INVENTOR.
SAUL L. MALKIEL
BY

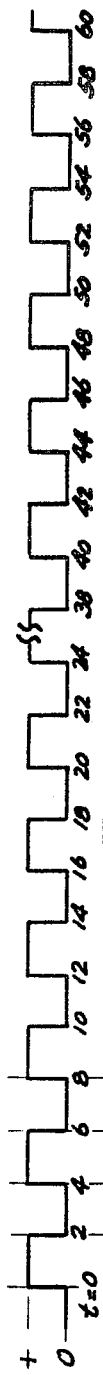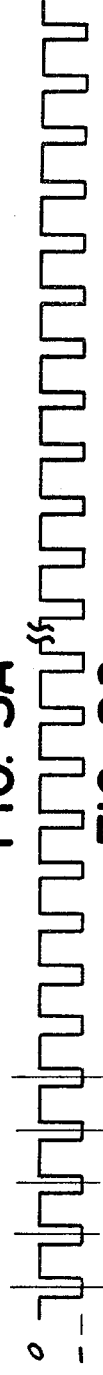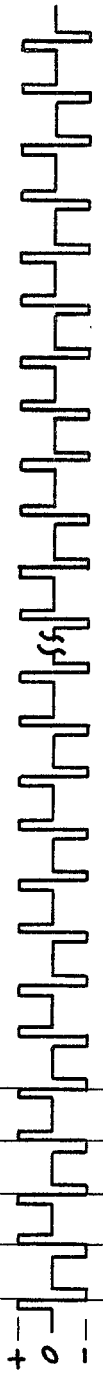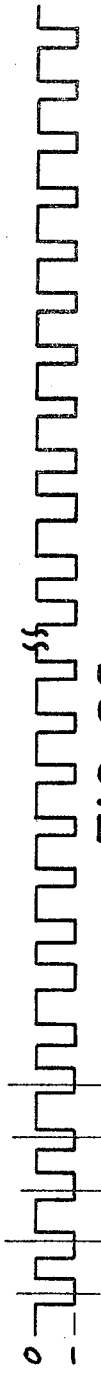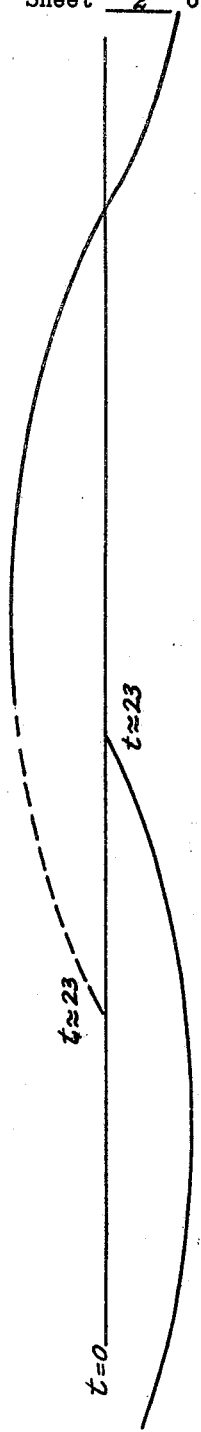

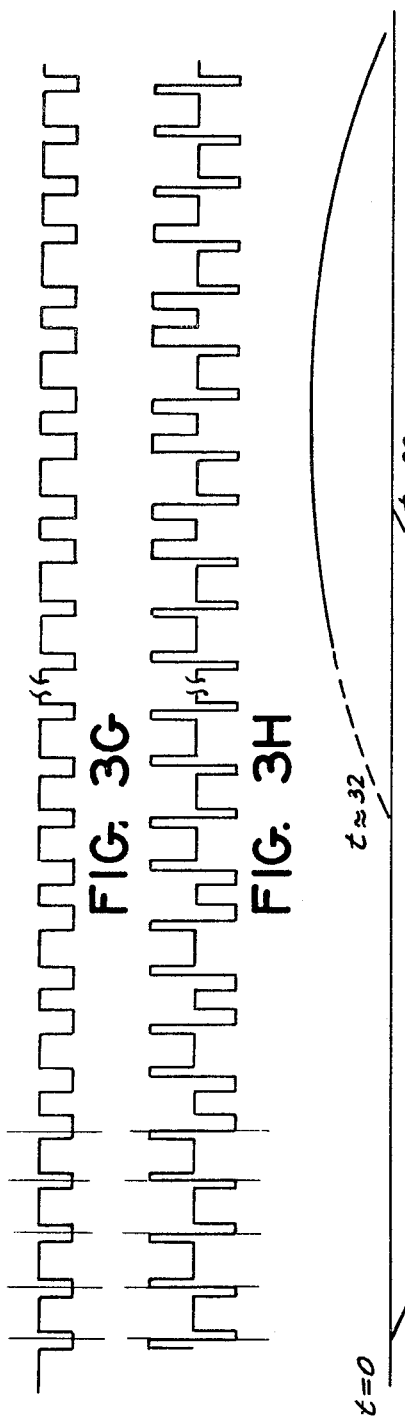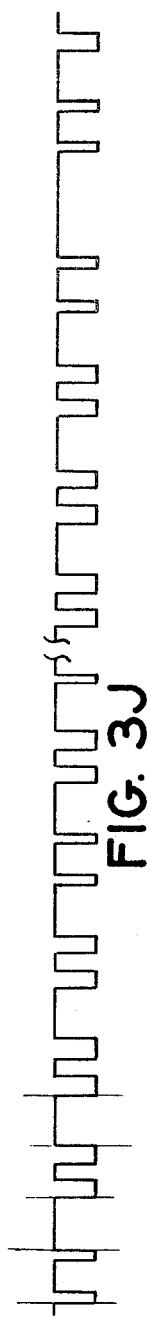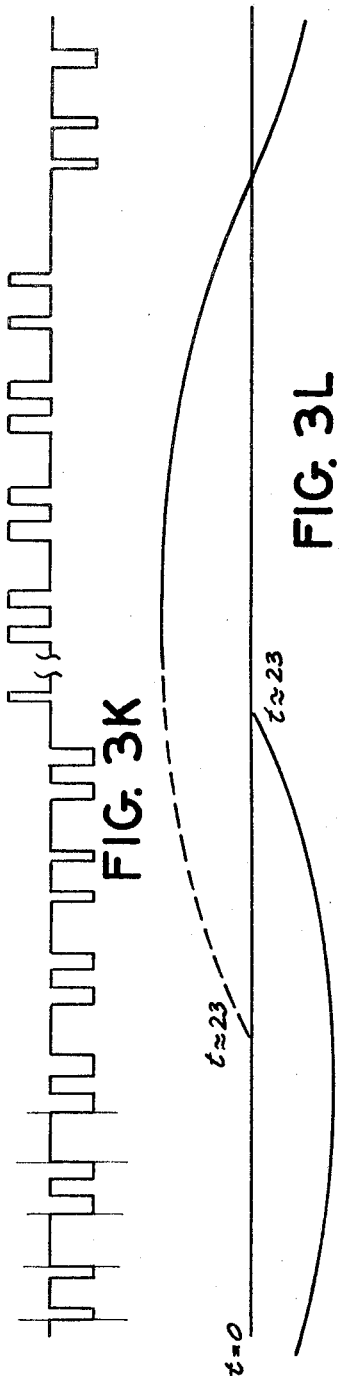

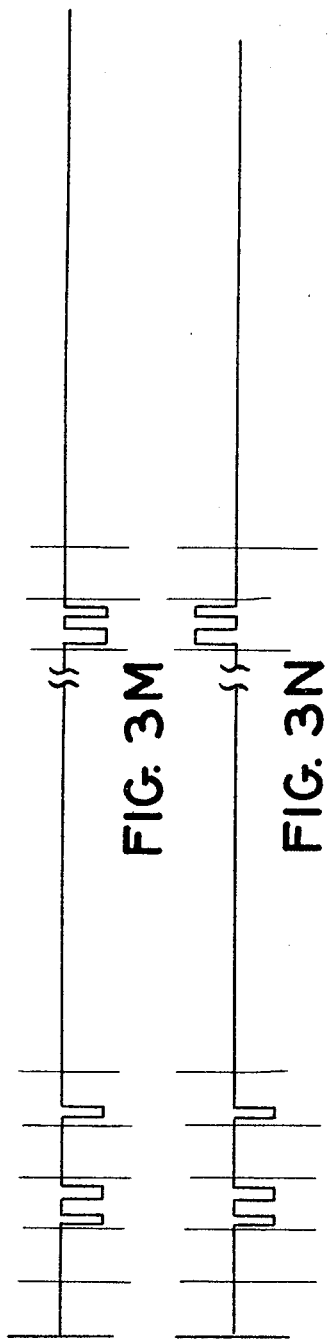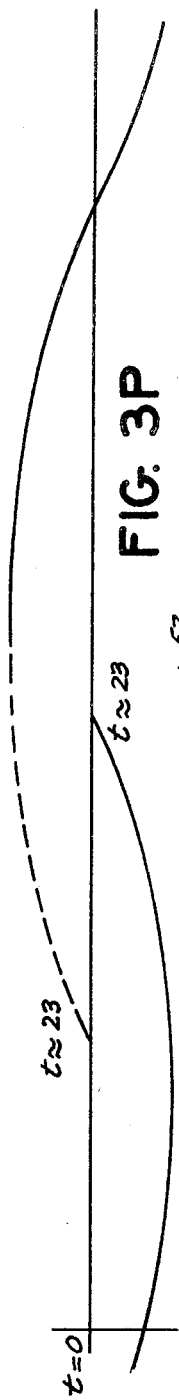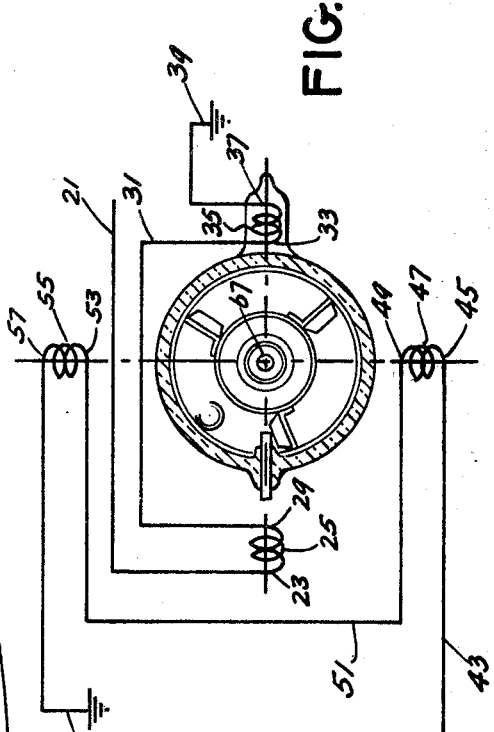

ATTORNEY

United States Patent Office 3,433,895
Patented Mar. 18, 1969

---

3,433,895
n-LEAF ROSE PATTERN OPTICAL RADIATION SENSOR AND TRACKER SYSTEM
Saul L. Malkiel, East Orange, N.J., assignor to The Bendix Corporation, a corporation of Delaware
Filed Oct. 25, 1966, Ser. No. 589,300
U.S. Cl. 178—7.2                                    21 Claims
Int. Cl. H04n 5/00, 5/38

ABSTRACT OF THE DISCLOSURE

This invention relates to an optical sensing mechanism and more particularly to an optical sensing mechanism utilizing an image dissector, one component of which is an electron multiplier, which may be used to sense the position of a source of radiation such as a star or planet.

Background of the invention

In the past radiation sensing systems and radiation tracking systems have required the use of moving parts which implies low reliability and a high failure rate. While this may be merely an expensive inconvenience in earth bound sensing or tracking systems, it is of extreme importance in artificial satellite and space probe endeavors.

Present systems also operate in two distinct modes; that is, coarse and fine tracking of radiation sources such as stars. In addition, the fact that these devices contain moving parts implies component degradation and consequent shifting of the system null position with an attendant loss of accuracy in source location.

A copending U.S. application Ser. No. 385,878, filed July 29, 1964, now Patent No. 3,366,830, issued Jan. 30, 1968, by William R. Polye and assigned to The Bendix Corporation, discloses a radiation sensor and tracker which may be utilized in the present invention in that it makes use of an electron multiplier such as disclosed and claimed in a U.S. Patent No. 3,128,408, granted Apr. 7, 1964, to George W. Goodrich and William C. Wiley for generating a scan pattern by the use of pitch and yaw coils providing an electromagnetic field which is used to deflect electrons emitted from a photocathode tube while a copending U.S. application Ser. No. 385,902, filed July 29, 1964, now Patent No. 3,372,266, Mar. 5, 1968, by Edward A. Chilton and George V. Zito and assigned to The Bendix Corporation discloses a star position determination circuit which may utilize an image dissector photomultiplier tube such as disclosed in the U.S. application Ser. No. 385,878, now Patent No. 3,366,830, issued Jan. 30, 1968.

Neither the application Ser. No. 385,878 nor the application Ser. No. 385,902, now Patent No. 3,372,266, issued Mar. 5, 1968, discloses the type of scan used in the present invention, particularly the provision of an n-leafed rose pattern together with means to utilize this mode of scan with an image dissector photomultiplier tube as in the present invention so as to effect the highest information rate in the most critical area, i.e., at boresight.

While scan patterns in the form of n-leafed roses have previously been utilized in a radiation sensor as disclosed in U.S. Patent No. 3,083,611, issued to A. J. Ziolkowski et al., Apr. 2, 1963, and U.S. Patent No. 3,107,070, issued to S. P. Willits et al., Oct. 15, 1963, there has been no recognition of the novel means to utilize the n-leafed rose scan pattern, as in the present invention, so as to effect a high information transmission rate in the most critical area, i.e., at boresight.

Thus in the U.S. Patent 3,107,070 there is disclosed a scan composed of overlapping circles as the primary means of information retrieval while as an alternative expedient it is suggested that an n-leaf rose pattern might also be utilized as well as any of a number of scan patterns.

Further in the U.S. Patent No. 3,083,611 there is provided a rose pattern with relatively simple operating components so as to effect a saving in space and weight, and said components being arranged to operate at least as well as other prior art devices with approximately one-half as many parts.

Further, these prior patents incorporating the n-leafed rose scan pattern effected such pattern by means of rotating prisms and other mechanical-optical means, while in the present invention the n-leafed rose scan pattern is effected by means of controlling the electrical energization of magnetic deflection coils of an image dissector photomultiplier tube which may be of a type disclosed in the copending U.S. application Ser. No. 385,878, now Patent No. 3,366,830, issued Jan. 30, 1968, and which control means may be so arranged as to effect two double sideband suppressed carrier signals, the modulating waves of which are in electrical phase quadrature, one of the signals being applied to the yaw axis deflection coils and another of said signals being applied to the pitch axis deflection coils.

However, neither the U.S. application Ser. No. 385,878 now Patent No. 3,366,830 nor the U.S. application Ser. No. 385,902 now Patent No. 3,372,266 discloses the circuitry utilized in the present invention nor the means for acquiring information as to the position of the source of radiation as in the present invention.

It is an object of the present invention to provide a combination of circuitry which electromagnetically effects an n-leafed rose scan, a dim source rejection, information as to measurement of source intensity, and means for sensing both point and extended sources of radiation.

It is therefore an object of the instant invention to provide an optical sensing device which has a scan in the form of an n-leafed rose pattern effected by electromagnetic means without the need of moving components.

It is another object of the instant invention to provide an optical sensing device which has one mode of operation which may be used to track continuously from the cone of acquisition to boresight without switching the mode of operation.

It is another object of the instant invention to provide an optical sensing device wherein there is no deterioration of system null information regardless of length of time of service of the device.

It is another object of the instant invention to provide an optical sensing device which contains no moving parts, so as to materially decrease the failure rate.

It is another object of the instant invention to provide an optical sensing device which will sense the object of greatest luminescence within the cone of acquisition.

It is another object of the instant invention to provide an optical sensing device which will reject less intense sources of radiation within the cone of acquisition where the less intense source of radiation is sufficiently spatially displaced from the source of radiation to be sensed.

It is another object of the instant invention to provide an optical sensing device which will yield information as to the intensity of the source of radiation sensed.

It is another object of the instant invention to provide an optical sensing device which will yield a constant amplitude signal for each degree of zenith of the sensed source of radiation regardless of the intensity of said source of radiation.

It is another object of the instant invention to provide an optical sensing device which will sense both a point and an extended source of radiation.

It is another object of the instant invention to provide an optical sensing device which will have its highest degree of resolution at boresight.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

*Description of the invention*

In the drawings:

FIGURE 2 is a sectional view taken on line 2—2 of the image dissector photomultiplier tube of FIGURE 1 and looking in the direction of the arrows.

FIGURES 3A through 3L are graphical illustrations of the electrical wave forms at the outputs of the video amplifier, synchronous demodulator and synchronous demodulator filter circuits of FIGURE 1, as hereinafter explained, and indicative of the various targets 1X through 5X shown by FIGURE 6.

In FIGURE 3A there is a graphical representation on a time scale of the primary circuit signal $E_1$ in the form of a square wave of a frequency $f_1$.

Figure 1:
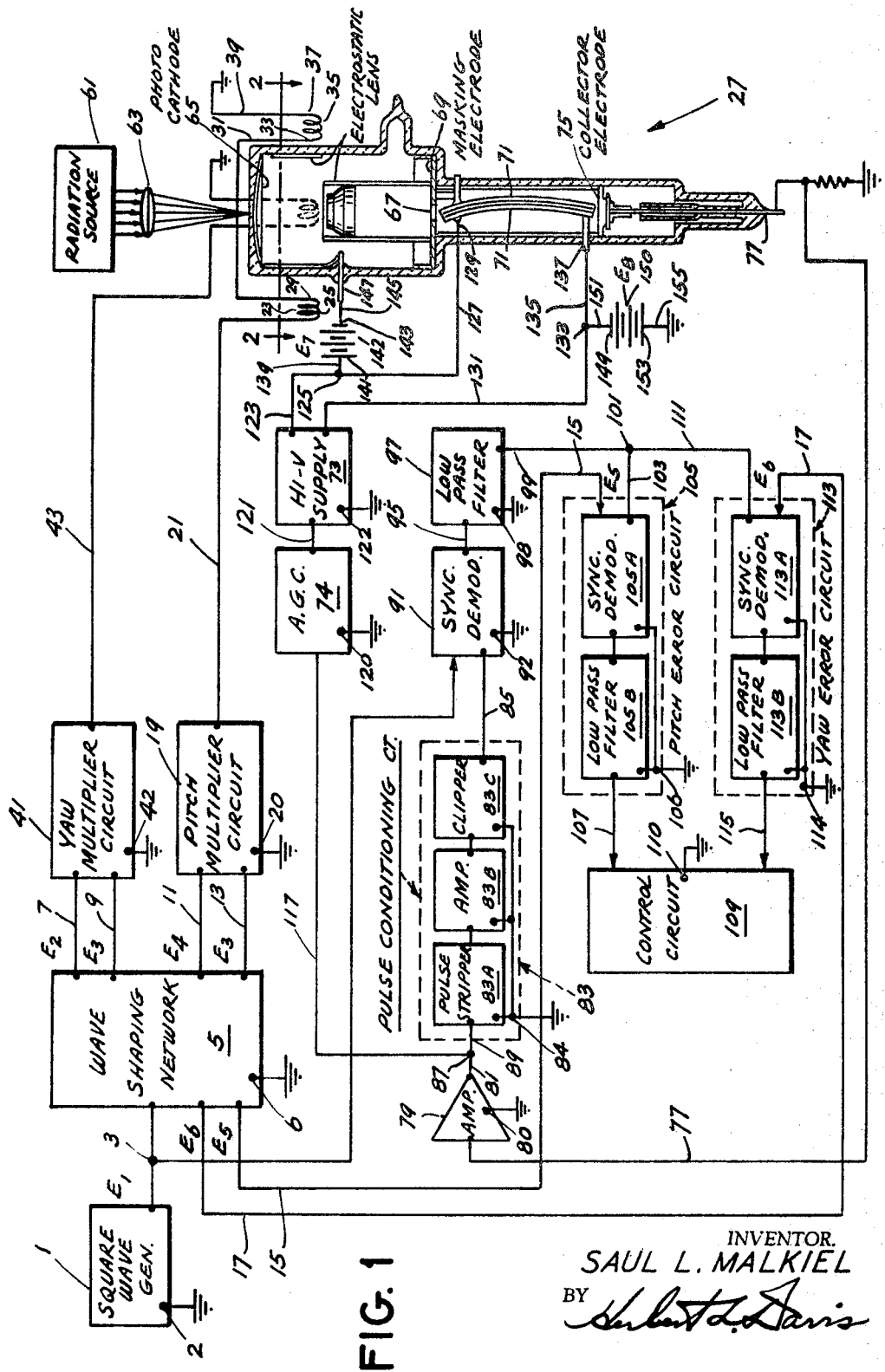
FIGURE 1 is a schematic wiring diagram of a radiation position sensor system embodying the invention.
Figure 6:
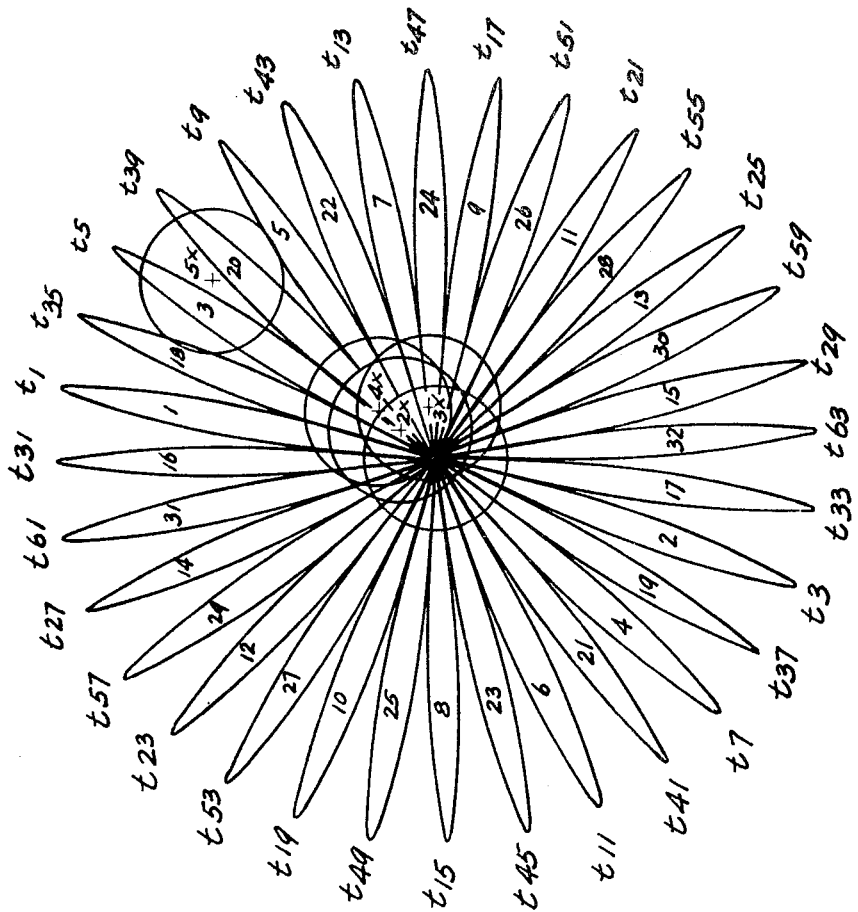

FIGURE 3B is a graphical representation on a time scale referenced to FIGURE 3A of the output of the video amplifier of FIGURE 1 when the source of radiation is in the target 1X position of FIGURE 6.

FIGURE 3C represents the output signal from the synchronous demodulator of FIGURE 1 for the target 1X position of the source of radiation. Since target 1X is shown at the boresight position of FIGURE 6, there is no error and there will be no output signal from the low pass filter of FIGURE 1.

FIGURE 3D is a graphical representation on a time scale referenced to FIGURE 3A of the output of the video amplifier of FIGURE 1 when the source of radiation is at the target 2X position of FIGURE 6.

FIGURE 3E is a graphical representation on a time scale of the output of the synchronous demodulator circuit of FIGURE 1 when the source of radiation is at the target 2X position of FIGURE 6.

FIGURE 3F is a graphical representation on a time scale of the output of filter circuit of FIGURE 1 for a source of radiation at the target 2X position of FIGURE 6.

FIGURE 3G is a graphical representation on a time scale referenced to FIGURE 3A, of the output of the video amplifier of FIGURE 1 when the source of radiation is at the target 3X position of FIGURE 6.

FIGURE 3H is a graphical representation on a time scale of the output of the synchronous demodulator circuit of FIGURE 1 when the source of radiation is at the target 3X position of FIGURE 6.

FIGURE 3I is a graphical representation on a time scale of the output of the filter circuit of FIGURE 1 for a source of radiation at the target 3X position of FIGURE 6.

FIGURE 3J is a graphical representation on a time scale referenced to FIGURE 3A of the output of the video amplifier of FIGURE 1 when the source of radiation is in the target 4X position of FIGURE 6.

FIGURE 3K is a graphical representation on a time scale of the output of the demodulator circuit of FIGURE 1 when the source of radiation is at the target 4X position of FIGURE 6.

FIGURE 3L is a graphical representation on a time scale of the output of the filter circuit of FIGURE 1 for a source of radiation at the target 4X position of FIGURE 6.

FIGURE 3M is a graphical representation on a time scale referenced to FIGURE 3A of the output of the video amplifier of FIGURE 1 when the source of radiation is in the target 5X position of FIGURE 6.

FIGURE 3N is a graphical representation on a time scale of the output of the demodulator circuit of FIGURE 1 when the source of radiation is in the target 5X position of FIGURE 6.

FIGURE 3P is a graphical representation on a time scale of the output of the filter circuit of FIGURE 1 for a source of radiation at the target 5X position of FIGURE 6.

FIGURES 4A through 4E are graphical representations of various wave forms at the output of the yaw and pitch error circuitry before their conversion to D.C. signals.

Figure 4A:
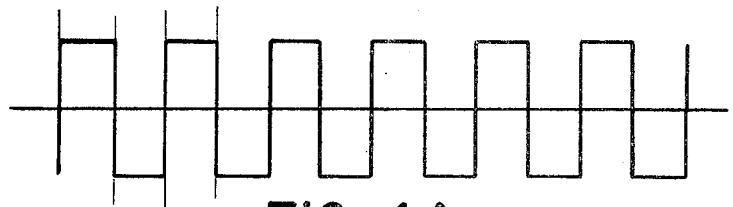

In FIGURE 4A there is shown a graphical representation on a time scale of signal $E_5$ of a square wave having a frequency $f_2$ applied at one input to the synchronous demodulator of the pitch error circuit of FIGURE 1.

Figure 4B:
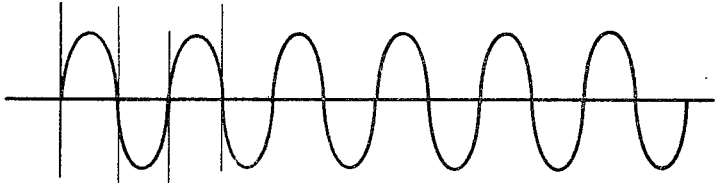

FIGURE 4B is a graphical representation on a time scale of the output of the low pass filter circuit of FIGURE 1 applied as another input signal to the synchronous demodulator of the pitch error circuit as well as an input signal to the synchronous demodulator of the yaw error circuit.

Figure 4C:
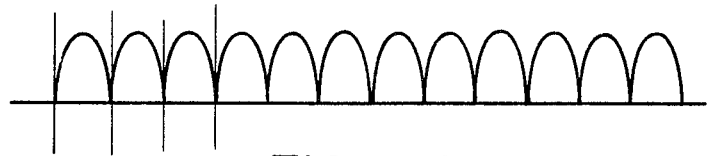

FIGURE 4C is a graphical representation of the output from the synchronous demodulator portion of the pitch error circuit of FIGURE 1 and indicating that where the output signal of FIGURE 4B from the low pass filter of FIGURE 1 and signal $E_5$ are in phase, the output of the synchronous demodulator section of said pitch error circuit will be in the form of a fully rectified sine wave which will yield a D.C. level which in turn may be used to energize control circuitry to track a source of radiation.

Figure 4D:
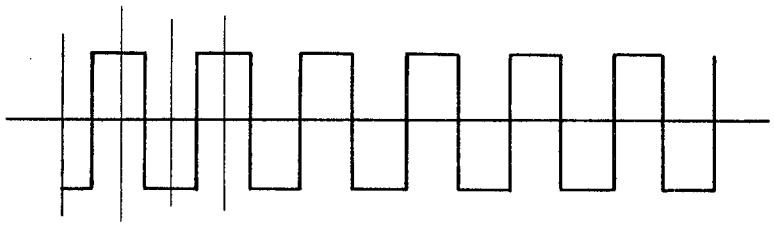

FIGURE 4D is a graphical representation on a time scale of signal $E_6$ of a square wave having a frequency $f_2$ in electrical phase quadrature with the signal $E_5$. The signal $E_6$ is applied to the input to the synchronous demodulator of the yaw error circuit, shown by FIGURE 1, in which the other input signal to said synchronous demodulator is the input signal, indicated graphically by FIGURE 4B, from the low pass filter of FIGURE 1.

Figure 4E:
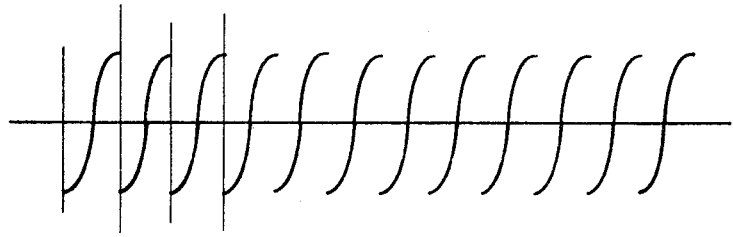

FIGURE 4E is a graphical representation of the output from the synchronous demodulator portion of the yaw error circuit of FIGURE 1 on a time scale, as shown graphically by FIGURE 4E, and indicating that where the output signal of FIGURES 4B from the low pass filter of FIGURE 1 and signal $E_6$ are in phase quadrature, the output of the synchronous demodulator section of said yaw error circuit will be in the form of a ripple voltage which will not yield a D.C. level, thus indicating the absence of a yaw error.

Figure 5A:
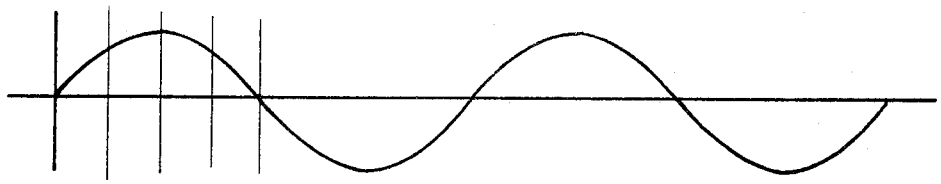

FIGURE 5A is a graphical representation of a modulating wave signal $E_2$ having a sinusoidal wave form of a frequency $f_2$ somewhat less than the frequency $f_1$ of the primary circuit square wave signal and of an amplitude A as represented by an equation $A \sin \omega_2 t$ and applied at an output of the wave shaping network, as shown by FIGURE 1, and at an input to a yaw multiplier circuit.

Figure 5B:
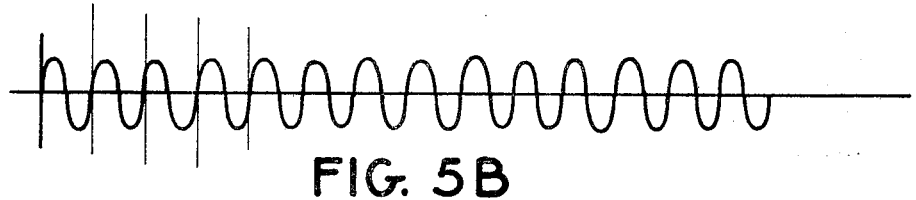

FIGURE 5B is a graphical representation of an electrical control wave signal $E_3$ having a sinusoidal wave form of a greater frequency $f_1$ and an amplitude B, as represented by an equation $B \sin \omega_1 t$ and applied at an output of the wave shaping network, as shown by FIGURE 1, and at an input to the yaw multiplier circuit and also at an input to a pitch multiplier circuit.

Figure 5C:
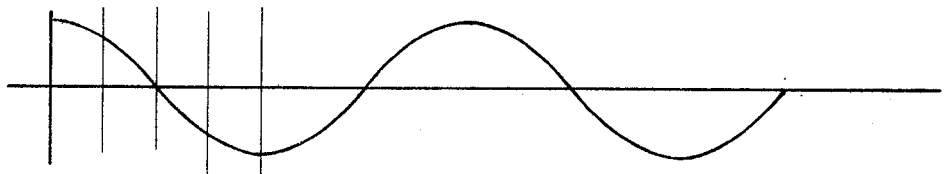

FIGURE 5C is a graphical representation of a second electrical modulating wave signal $E_4$ having a sinusoidal wave form of the same frequency $f_2$ as that of the signal $E_2$ and being in phase quadrature therewith and of an equal amplitude A, as represented by an equation $$A \cos \omega_2 t$$

and applied at an output of a wave shaping network, as shown by FIGURE 1, and at another input to the pitch multiplier circuit.

Figure 5D:
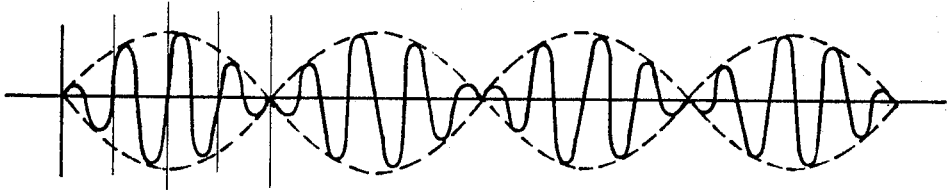

FIGURE 5D is a graphical representation of the wave form appearing at the output of the yaw circuit multiplier as a resultant of the product of signals $E_2$ and $E_3$ effected by the yaw circuit multiplier of FIGURE 1.

Figure 5E:
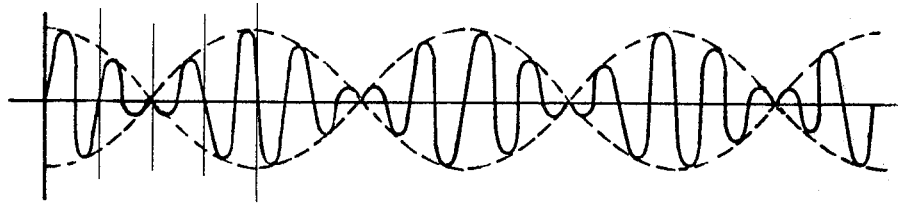

FIGURE 5E is a graphical representation of the wave form appearing at the output of the pitch circuit multiplier as a resultant of the product of signals $E_3$ and $E_4$ effected by the pitch circuit multiplier of FIGURE 1.

FIGURE 6 is a graphical representation of the $n$-leafed rose pattern signal scan of the instant device as produced by a time varying electromagnetic field, including leaf numbers, corresponding time periods and various sources of radiation represented as targets.

Referring now to the drawing of FIGURE 1, there is shown a radiation position sensor and tracker system embodying the instant invention in which there is provided from a suitable source of electrical energy 1 having a grounded output terminal 2 and an output conductor 3 through which there is applied from the source 1 a primary circuit square wave signal $E_1$ of a frequency $f_1$.

The square wave signal $E_1$ is applied through the conductor 3 to an input of a wave shaping network 5 of conventional type. The wave shaping network 5 has grounded input-output terminal 6 and output conductors 7, 9, 11, 13, 15 and 17. The output conductor 7 has applied thereto the electrical signal $E_2$ of a sinusoidal wave form with the frequency $f_2$ and an amplitude A, as represented by the equation $A \sin \omega_2 t$ and shown graphically in FIGURE 5A. The output conductor 9 has applied thereto the electrical signal $E_3$ of a sinusoidal wave form of the frequency $f_1$ and an amplitude B, as represented by the equation $B \sin \omega_1 t$, as shown graphically in FIGURE 5B; and the output conductor 11 has applied thereto the electrical signal $E_4$ of a sinusoidal wave form of the frequency $f_2$ and an amplitude A, as represented by the equation $A \cos \omega_2 t$, as shown graphically in FIGURE 5C.

Further, the output conductor 13 has applied thereto the electrical signal $E_3$ of the sinusoidal wave form, as heretofore explained. The output conductor 15 has applied thereto an electrical signal $E_5$ of a square wave form having a frequency $f_2$ and the output conductor 17 has applied thereto an electrical signal $E_6$ also of a square wave form having a frequency $f_2$, but being in electrical phase quadrature with the electrical signal $E_5$ of the aforesaid square wave form.

The wave-shaping network 5 is connected through conductors 11 and 13 to a pitch circuit multiplier 19 of a conventional type having a grounded input-output conductor 20, and with the signal $E_4$ being carried by the conductor 11 and the signal $E_3$ being carried by the input conductor 13 to respective inputs of the pitch multiplier circuit 19.

An output signal from said pitch circuit multiplier 19 is connected through a conductor 21 to one end or leg 23 of a pitch coil 25 of an image dissector photomultiplier tube 27 which may be of a type described and claimed in the aforenoted copending U.S. application Ser. No. 385,878 and shown schematically in FIGURE 1. The other end or leg 29 of said pitch coil being connected through a conductor 31 to one end or leg 33 of pitch coil 35, the other end or leg 37 of coil 35 being connected through a conductor 39 to ground.

Wave shaping network 5 is also connected through output conductors 7 and 9 to a yaw circuit multiplier 41 having an input-output terminal 42 connected to ground, and with the output signal $E_2$ being carried by the conductor 7 while the output signal $E_3$ is carried by conductor 9 to respective inputs of the yaw multiplier circuit 41. The output signal of the yaw circuit multiplier 41 is applied through a conductor 43, as shown by FIGURE 2, to one end or leg 45 of a yaw coil 47 of the image dissector photomultiplier tube 27 of the type described and claimed in the aforenoted U.S. application Ser. No. 385,878. The other end or leg 49 of said yaw coil being connected through a conductor 51 to one end or leg 53 of yaw coil 55, the other end or leg 57 being connected through a conductor 59 to ground.

Pitch coils 25 and 35 and yaw coils 47 and 55 may correspond to the X and Y axis coils respectively of the image dissector photomultiplier tube described and claimed in the aforenoted U.S. application Ser. No. 385,878 now Patent No. 3,366,830.

In the operation of the image dissector photomultiplier tube 27, as explained in the U.S. application Ser. No. 385,878, now Patent No. 3,366,830 a source of radiation such as a star or planet, indicated schematically in FIGURE 1 by the numeral 61 transmits light waves which are gathered by a lens 63 which focuses the rays causing a photoimage of the star or other celestial body to impinge on the outer surface of a photocathode 65 of the image dissector 27. The photocathode 65 now emits electrons which will be transmitted to and focused upon an aperture 67 in a masking electrode or plate 69, the attractive forces and focusing being accomplished by a suitable source of electrical energization $E_7$ shown in FIGURE 1 as a battery having a negative terminal connected to the photocathode 65 and a positive terminal connected to the masking electrode or plate 69, as hereinafter explained in greater detail.

The electrons which pass through the aperture 67 of said plate 69, shown in greater detail in FIGURE 2, enter an electron multiplier tube 71, shown by FIGURE 1, and which may be of a type described and claimed in the U.S. Patent No. 3,128,408, granted Apr. 7, 1964, to George W. Goodrich et al. and assigned to The Bendix Corporation.

Energization of the electron multiplier tube 71 is provided by a suitable variable high voltage supply 73 having output conductors connected across the electron multiplier tube 71 while the output voltage applied by the high voltage supply 73 is controlled by an automatic gain control circuit 74, as hereinafter explained. The electrons supplied at the output of said electron multiplier tube 71 are collected by a collector electrode or anode 75. The electrons collected by the electrode 75 are in turn transmitted through a conductor 77 to an input of a video amplifier 79 having a grounded input-output terminal 80 and an output conductor 81 connected through a junction 87 and a conductor 89 to an input of a pulse conditioning circuit 83 of a conventional type having a grounded input-output terminal 84.

The pulse conditioning circuit 83 includes a pulse stripper circuit 83A, an amplifier 83B, and a clipper circuit 83C, all of which are of a conventional type.

The pulse stripper circuit 83A transmits only the peaks of those waves which exceed a predetermined critical value. The amplifier 83B amplifies the transmitted peaks and the clipper circuit 83C clips the amplified peaks, so as to eliminate noise in said peaks.

The output signal from this pulse conditioning circuit 83 is transmitted through a conductor 85 to one input of a synchronous demodulator circuit 91 having a grounded input-output terminal 92. An additional input signal $E_1$ corresponding to the primary circuit square wave signal is carried by a conductor 93 from the conductor 3 to a second input to the synchronous demodulator 91. The synchronous demodulator circuit 91 applies an output signal through a conductor 95 which is the resultant of the demodulation of the output pulses from the pulse conditioning circuit by the square wave signal $E_1$ of the frequency $f_1$ and which are dependent upon the target positions, as hereinafter explained by way of example with reference to targets 1X through 5X as shown graphically by FIGURES 3C, 3E, 3L, 3K and 3N.

The output signal at conductor 95 is applied then to the input of a low pass filter circuit 97 having a grounded input-output terminal 98. The low pass filter circuit 97 is arranged to pass to an output conductor 99 only frequencies of $f_1$, or lower frequencies. The output signal from said filter rircuit 97 is transmitted through the conductor 99 to a junction 101, said junction being connected through a conductor 103 to one input of a pitch error circuit 105 having a grounded input-output terminal 106.

The pitch error circuit has the output signal $E_5$ applied by the wave shaping network 5 connected through the conductor 15 to a second input of the pitch error circuit 105. The pitch error circuit 105 includes a conventional type synchronous demodulator 105A, and a low pass filter 105B arranged to pass frequencies between D.C. and a frequency $f_3$, $f_3$ being of a lower frequency than $f_2$ and representing the image motion bandwidth of the system. The exact value of frequency $f_3$ will be dependent upon the requirements of control circuitry as hereinafter explained in greater detail.

One input signal to the aforesaid synchronous demodulator portion 105A of the pitch error circuit 105 is the output signal from the low pass filter circuit 97 as graphically represented by FIGURE 4B upon the target X not being at boresight. The other input to said synchronous demodulator portion 105A of pitch error circuit 105 is signal $E_5$, a square wave of frequency $f_2$ as provided by wave shaping network 5 and graphically represented in FIGURE 4A. The output of the demodulator portion 105A of the aforesaid pitch error circuit, as shown graphically by FIGURE 4C, will be a function of the output signal from the low pass filter 97, as shown graphically by FIGURE 4B, as modified by the square wave signal $E_5$ shown graphically by FIGURE 4A.

When the output signal from the low pass filter 97 and signal $E_5$ are in phase, the resultant output from the synchronous demodulator 105A will be a fully rectified sine wave. The signal is now an input to the aforesaid low pass filter portion 105B of the pitch error circuit 105 which is arranged to pass frequencies between D.C. and a frequency $f_3$, $f_3$ as heretofore discussed being of a lower frequency than $f_2$ and representing the image motion bandwidth of the system. The output signal of this low pass filter portion 105B, will contain a D.C. level and a signal of a frequency less than $f_3$ representing image motion.

This essentially D.C. signal which is the pitch error signal is now transmitted through a conductor 107 to a conventional type control circuitry 109 having a grounded input terminal 110. The control circuitry 109 is arranged to control suitable apparatus to reorient the radiation position sensor 27, its housing or an outer space vehicle carrying the sensor 27 in such a sense as to position the image dissector photomultiplier tube 27 on the target X or in alignment with the radiation source 61 so as to in turn null the D.C. error signal.

When, however, the output signal from the low pass filter 97 and signal $E_5$ are in electrical phase quadrature, the resultant will be a ripple voltage. This signal is now an input to the aforesaid low pass filter portion 105B of the pitch error circuit 105 which has the property of transmitting frequencies of $f_3$ or lower frequencies. The output signal of this low pass filter portion 105B will now be the input to the control circuit 109. In the instant case, where the input signal is a ripple voltage, there will, of course, be no D.C. level, thus indicating the absence, in this instance of pitch error.

The output of filter network 97 appearing at junction 101 is also transmitted through a conductor 111 to one input of a yaw error circuit 113 having a grounded input-output terminal 114 while another input to said yaw error circuit 113 is connected through a conductor to the electrical signal $E_6$ applied by the wave shaping network 5.

The yaw error circuit 113 includes a conventional type synchronous demodulator 113A, and a low pass filter 113B so arranged as to pass frequencies of $f_3$ or lower frequencies, as in the heretofore discussed pitch error circuit 105.

One input signal to the aforesaid synchronous demodulator portion 113A of the yaw error circuit 113 is the output signal from the low pass filter circuit 97, as graphically represented by FIGURE 4B, upon the target being not at the boresight of the sensor 27. The other input to said synchronous demodulator portion 113A of the yaw error circuit 113 is signal $E_6$, a square wave of frequency $f_2$ as provided by the wave shaping network 5 through conductor 17 and graphically represented in FIGURE 4D. It will be seen by a comparison of the graphical representations of FIGURES 4A and 4D that the signals $E_5$ and $E_6$ are in electrical phase quadrature.

The output, as graphically represented in FIGURE 4E, of the demodulator portion 113A of the aforesaid yaw error circuit 113 will be a function of the output signal from the low pass filter 97, as modified by the square wave signal $E_6$, the wave forms of which inputs being graphically represented in FIGURES 4B and 4D. Thus for the particular circumstance shown, i.e., when the output signal from the low pass filter 97 and signal $E_6$ are in electrical phase quadrature, the resultant will be a ripple voltage as represented by FIGURE 4E. This signal is now an input to the aforesaid low pass filter portion 113B of the yaw error circuit 113 which has the property of transmitting frequencies of $f_3$ or lower frequencies. The output signal of this low pass filter portion 113B will now be the input to the control circuit 109. In the instant case, where the input signal is a ripple voltage, there will, of course, be no D.C. level, thus indicating the absence, in this configuration of yaw error.

However, when the output signal from the low pass filter 97 and signal $E_6$ are in phase, the resultant output from the synchronous demodulator 113A will be a fully rectified sine wave. This signal is now an input to the aforesaid low pass filter portion 113B of the yaw error circuit 113 which is arranged to pass frequencies of $f_3$ or lower frequencies. The output signal of this low pass filter portion 113B, will now be the input to the control circuit 109.

This essentially D.C. signal which is the yaw error signal is now transmitted through a conductor 115 to control circuitry 109 which may be of a conventional type to in turn reorient the radiation position sensor 27 or its housing, e.g., a space vehicle carrying the radiation position sensor 27 in such direction as to null the D.C. error signal supplied by the yaw error circuitry 113.

It is obvious that conditions may occur where both the pitch and yaw error circuits will yield D.C. output signals to operate the control circuit 109, or where neither circuit yields a D.C. error signal, indicating that the target X is at boresight.

The output of the video amplifier 79 is also connected through a conductor 81 to a junction 87 and thereby connected through a conductor 117 to an input of an automatic gain control circuit 74 of conventional type having an input-output terminal 120 connected to ground. The output of the automatic gain control circuit 74 is connected through a conductor 121 to the variable high voltage supply 73 having a grounded input terminal 122 and arranged in cooperative relation therewith to vary the output voltage from the variable high voltage supply 73 in inverse relation to the amplitude of the signal pulses provided by the video amplifier 79 so as to regulate the output voltage from said video amplifier 79 to a predetermined condition, as hereinafter explained.

The output from the variable voltage supply 73 as thus controlled is connected through one conductor 123 to a junction 125 which is in turn connected through a conductor 127 to one end 129 of the electron multiplier tube 71. The output of the regulated variable high voltage supply 73 is connected by an opposite conductor to a junction 133 which is in turn connected through a conductor 135 to the other end 137 of the electron multiplier tube 71.

The output electrical signal from the high voltage supply 73 which appears at junction 125 is also connected through a conductor 139 to the positive terminal 141 of a suitable source of electrical energization $E_7$, here indicated as a battery 142. The negative terminal 143 of said source 142 of electrical energization $E_7$ is connected through a conductor 145 to one end 147 of the aforesaid photocathode 65. The other output conductor 131 of the variable high voltage supply 73 which is connected to junction 133 is connected through said junction 133 to the negative terminal 149 of a suitable source of electrical energization $E_8$, here indicated as a battery 150, by a conductor 151. The positive terminal 153 of said source of electrical energization $E_8$ is connected through a conductor 155 to ground.

The components of the image dissector photomultiplier tube 27 herein appearing, but not described, are fully discussed in the copending U.S. application Ser. No. 385,878.

Referring now to the drawing of FIGURE 6, there is shown an $n$-leafed rose which is a graphical representation of the scan of the system as produced by the pitch and yaw coils. The numbers within the leaves represent the numbers of the scans whereas the numbers outside the leaves e.g., $t_1$, $t_{35}$, etc., represent the time at which that point in the scan is reached, where all even numbered times, e.g., $t_0$, $t_2$, $t_4$, etc., occur in the center of the $n$-leafed rose, the time of zero magnetic field. Also shown are targets 1X through 5X, target 1X appearing at boresight, target 2X appearing on some azimuthal line within the proportional region, target 4X appearing on the same azimuthal line on the border of the proportional and non-proportional regions, target 5X appearing on the same azimuthal line in the non-proportional region and target 3X appearing on a different azimuthal line within the proportional region.

*Operation*

In the operation of the optical position sensor of the instant invention a source of radiation 61 such as a star or planet transmits radiation waves of energy which impinge upon the lens 63, the lens in turn transmitting and focusing said waves at a point upon a photocathode 65. The photocathode, due to the radiation energy impinging upon it, will now emit electrons which will travel to the masking electrode or aperture plate 69, the attractive forces acting on the electrons and the electronic focusing being accomplished by use of a source of energization $E_7$ connected between the cathode and aperture plate.

When the source of radiation, for example, a star, is at boresight, boresight being defined as the center of the aperture 67 of the masking plate 69, the size of said aperture 67, as shown in FIGURE 2, being small in relation to the size of the plate 69, the electrons emitted from the photocathode 65 representing said source of radiation will pass through the aperture 67 of the plate 69 and enter the electron multiplier tube 71, said electron multiplier tube being of a type well known in the art, for example one such as that disclosed and claimed in U.S. Patent No. 3,128,408, granted April 2, 1964, to Goodrich et al. and assigned to The Bendix Corporation.

When, however, the source of radiation is not within the proportional region, the proportional region being defined as the projection of the aperture 67 of the plate 69 on the cone of acquisition of the system wherein zenith as well as azimuth information is quantitatively acquired, the lens 63 gathering the radiation waves will focus said waves at a point on the photocathode 65 not corresponding to the projection of the aperture 67 of the plate 69 on the photocathode 65.

In such case while the potential $E_7$ provided between the photocathode 65 and the aperture plate 69 will again cause the transmission of the electrons from the cathode to the plate with proper focusing, these electrons will now impinge upon the aperture plate 69 itself and will not pass through the aperture 67 of said plate 69. Thus these electrons will not enter the electron multiplier tube 71 and therefore no electrons will appear at the exit aperture of said electron multiplier tube 71 to be collected by the anode 75.

For this reason an electromagnetic field is impressed between the cathode and the aperture plate, said field being provided by two coil pairs 25, 35 and 47, 55 termed the pitch coils and the yaw coils, respectively, disposed in spatial quadrature as shown in the copending U.S. patent application Ser. No. 385,878, filed July 29, 1964, now Patent No. 3,366,830, issued Jan. 30, 1968, by William R. Polye and assigned to The Bendix Corporation, and in FIGURE 2 of the present invention, and said coils being energized, respectively, by double sideband suppressed carrier input signals to said two coil pairs in which the modulation of the signal energizing one of said pair of coils is in electrical phase quadrature with the other of said double signals energizing the other of said pair of coils.

It has been discovered in the present invention that by providing the aforesaid input signals to the two coils or coil pairs 25, 35 and 47, 55, i.e., double sideband suppressed carrier signals where the modulating waves of said signals are in electrical phase quadrature and the coils or coil pairs to which the signals are provided are in space quadrature, there is effected the $n$-leafed rose scan of the instant invention shown graphically by FIGURE 6, and without the use of components in motion, e.g., rotating prisms as has been provided in prior systems.

These double sideband, suppressed carrier signals energizing the coils 25, 35 and 47, 55 in spatial quadrature effect the scan pattern in the form of the $n$-leafed rose, shown graphically by FIGURE 6. These energizing signals are provided as electrical output signals from a pair of multiplier circuits of conventional type well known in the art, e.g., a magneto-resistive multiplier or Hall effect multiplier. The signals to be multiplied, as herefore described, are in the form $A \sin \omega_2 t$ and $B \sin \omega_1 t$ applied as input signals to one multiplier circuit and in the form $A \cos \omega_2 t$ and $B \sin \omega_1 t$ applied as input signals to the other multiplier circuit and in which the output from one of said multiplier circuits provides one of the double sideband suppressed carrier signals and the other of said multiplier circuits provides the other of said double sideband suppressed carrier signals with the modulating waves of said signals being in electrical phase quadrature.

Although this invention has been described as using two sinusoidal signals as the input signals to multiplier circuit, so as to provide double sideband suppressed carrier signals to coil pairs, said coil pairs being in spatial quadrature, other energizing signals may be used. By way of example, input signal $E_3$, heretofore represented as being of the waveform $B \sin \omega_1 t$, may be replaced by other waveforms such as a triangular waveform, with the requirements being only that the other waveforms have the same fundamental frequency as input signal $E_3$ represented in the aforenoted description as $B \sin \omega_1 t$. Also the other waveforms must have zeros and maxima occurring at the same time as those of input signal $E_3$, as graphically represented in FIGURE 5B. Use of input signals having waveforms as before noted in place of signals having sinusoidal waveforms will again result in a scan pattern in the form of an $n$-leafed rose.

The time varying electromagnetic field resulting upon the energization by said signals of the coils 25, 35 and 47, 55 arranged in spatial quadrature has the effect of altering the path of electrons emitted from the cathode 65 as they travel to the aperture plate 69. This causes electrons emitted from said photocathode 65 to enter the aperture 67 of the plate 69 even when the projection of said aperture 67 on the photocathode 65 does not encompass the point on the photocathode 65 from which the electrons are emitted.

Thus it will be seen that impressing this time varying electromagnetic field, shown graphically by FIGURE 6, between the photocathode 65 and the plate 69 has the same effect as altering the position of the aperture 67 in the plate 69 so that its projection on the photocathode 65 will, at various times, encompass all possible electron emission points on the photocathode 65.

The result can alternatively be understood by viewing the time varying electromagnetic field as effecting an alteration of the position of the electron emitting point of the photocathode 65 over the surface of the photocathode 65 so that at various times it will be within the projection of the stationary aperture 67 of the plate 69 on the photocathode 65.

Thus, the electromagnetic field will vary in the pattern of a multi-leafed or lobed rose as shown by FIGURE 6, causing both a zenith and azimuth scan so that when the source of radiation 61 is not within the proportional region, and thus absent the time varying electromagnetic field, the emission of electrons from the photocathode 65 which is a function of radiation source 61 would not enter the plate aperture 67, the time varying electromagnetic field will curve the path of the electrons between the photocathode 65 and the plate 69, and upon the proper electromagnetic field being present will cause the electrons to pass through the plate aperture 67. The electrons then enter the aforesaid electron multiplier tube 71 and the electrons exiting from said electron multiplier tube 71 are now collected by an anode 75 which thereupon transmits the signal to a video amplifier 79.

The output of the video amplifier 79 will be pulses of electrical energy. The time of occurrence of these pulses will correspond to the particular scan lobes as numbered within said lobes, as shown in FIGURE 6, which cause electrons to enter the plate aperture 67 and also to the point on said scan lobes at which electrons enter the plate aperture 67. The relative time position of these pulses will thus contain azimuth and zenith information. Further, the duration of these pulses will correspond to the length of time in which the instantaneous field of view encompasses the point of electron emission of the photocathode 65, said point of electron emission corresponding to the source of radiation where the instantaneous field of view is defined as the instantaneous projection of the aperture 67 on the photocathode 65.

It will be seen that by taking the time at which a particular scan encompasses the representation of a source of radiation on the photocathode 65, when said source is at boresight as a central time, there will be a time offset directly related to the zenith of the source of radiation. This is seen by realizing that as the instantaneous field of view of the scan progresses to the outermost point of the cone of acquisition time will pass before this instantaneous field of view encompasses the representation of the source of radiation on the photocathode 65 as related to the central time when the representation would be encompassed if the source of radiation were located at boresight.

Thus pulses of electrical energy for a particular scan on the outward path of said scan will occur later in time, at a time proportional to the zenith of the source of radiation, as related to the time the pulses would occur if the source of radiation were located at boresight. By analogous reasoning it is seen that a scan on its return to the center of the cone of acquisition (the zero magnetic field condition) will result in a pulse as it encompasses the representation on the photocathode 65 of the source of radiation before the same scan would result in a pulse if the source of radiation were located at boresight. Thus it will be seen that information as to both azimuth and zenith is contained in the pulse position on a time scale, since azimuth information is yielded by determining which scans result in a pulse and zenith information is contained in the relative position of the pulse as compared to where the pulse would occur due to the particular scan if the source were located at boresight.

The aforesaid pulses provided by the video amplifier 79 now enter the pulse stripper portion 83A, of a pulse conditioning circuit 83, said circuit 83A being provided with a preset critical value so that it will transmit only the portions of the input pulses which exceed the aforesaid critical value. In addition the pulse conditioning circuit contains an amplifier 83B which amplifies the aforesaid transmitted peaks and a clipper circuit 83C which will level the peaks of these amplified signals, thus eliminating noise carried by said signals.

The pulse conditioning circuit 83 has two functions, one being, as just discussed, to clip the peaks of input pulses which exceed a critical value after said peaks have been transmitted and amplified thus reducing noise levels and the second is to cause sensing of the brightest source of radiation within the cone of acquisition of the system.

This acquisition and rejection is dependent upon two parameters, one being the aforementioned waves, the peaks of which exceed a preset critical value, the other parameter being a requirement of a sufficient spatial separation between the two sources of radiation, the sufficient spatial separation being equal to the radius of the proportional region.

This latter requirement will more easily be understood if one realizes that if both sources of radiation are separated by a distance less than the radius of a proportional region, the electron emission from the photocathode region, caused by each source of radiation will enter the aperture 67 of the plate 69 at the same time and be collected by the anode 75 as a unit, thus both the input pulse to and output pulse from the video amplifier 79 will be a product of the combination of the two sources of radiation with the subsequent circuitry effectively being activated by one source of radiation of an intensity exceeding the intensity of either of the two true sources of radiation and at a location corresponding to the center of brightness of the two sources of radiation.

The output signal provided by the pulse conditioning circuit 83 is applied to a synchronous demodulator circuit 91 which has as one input signal a square wave at a frequency $f_1$, said signal being the primary signal of the system, the other energizing signals being derived by means well known in the art from this primary signal by appropriate wave shaping circuitry 5 yielding sinusoidal waves and square waves of frequencies $f_1$ and $f_2$, frequency $f_2$ being some fraction of $f_1$. The purpose of deriving all energizing signals from a primary signal is to provide a uniform time reference throughout the system.

The output signal provided by the aforesaid demodulator 91 is a series of positive and negative pulses with a polarity dependent upon the phase relation between the input pulse to the demodulator 91 and the square wave reference signal of frequency $f_1$, as shown in FIGURE 3A. This output signal from the demodulator 91 is applied through a conductor 95 to the input of a low pass filter circuit 97 which passes frequencies of value $f_2$ or frequencies which are lower.

The signal output of the aforesaid low pass filter 97 will be dependent in magnitude and phase upon the position of the source of radiation when the source is within the proportional region and will be dependent in phase only at other times when the source is within the cone of acquisition of the system but not within the proportional region.

If the source of radiation is offset from boresight, a sinusoidal wave at the frequency $f_2$ will be provided at the output of the low pass filter 97, as shown in FIGURES 3F, 3I, 3L and 3P for various positions of the source of radiation, for example 2X, 3X, 4X and 5X, respectively. This wave contains in its phase relation information as to the azimuth of the source of radiation and contains, in its amplitude, information as to the zenith of the point of radiation where the zenith is within the proportional region of the device, where as before stated, the proportional region corresponds to the aperture 67 of the plate 69.

The way in which the aforesaid information is contained can be best seen by reference to FIGURES 3B and 3C. When the source of radiation is in the target 1X position, i.e., at boresight, each scan will result in a pulse, the centroid of said pulse being aligned with either the positive going or negative going transitions of the demodulator reference square wave, as shown in FIGURE 3A. The output of the demodulator 91, as shown in FIGURE 3C, will then be a series of negative and positive pulses due to the interaction in the demodulator 91 of the aforesaid square wave, shown graphically by FIGURE 3A, and the pulse output from the video amplifier 79, as shown graphically by FIGURE 3B.

Since the centroid of the pulse outputs of the video amplifier 79 are aligned with the negative going and positive going transitions of the demodulator square wave, the output of the demodulator 91 will contain positive and negative going pulses of equal duration and thus the output signal from the low pass filter 97 following the demodulator 91 will be zero. When the source of radiation is within the proportional region, but not located at boresight as shown by target 2X, represented graphically on FIGURE 6, the output of the video amplifier 79 will be as shown in FIGURE 3D. It will be seen here that the centroid of each pulse is no longer aligned with the negative going or positive going transitions of the synchronous demodulator reference square wave, as shown in FIGURE 3A, and the combination of the two waves in the synchronous demodulator 91 result in an output signal from said synchronous demodulator 91, as shown graphically in FIGURE 3E, where it is seen that the positive and negative pulses are no longer of equal duration.

The output signal provided by the low pass filter 97 is shown in FIGURE 3F where it may now be seen that the amplitude of the filter output sine wave is dependent in magnitude upon two parameters, one parameter being the number of pulses at the output of the video amplifier 79 which in turn is dependent upon how many scan lobes encompass the point on the photocathode corresponding to the source of radiation and the other parameter being the time relation of the pulses provided at the ouput of the video amplifier 79 in relation to the negative going and positive going transitions of the square wave input, shown graphically at FIGURE 3A, to the synchronous demodulator 91 and which provides the system reference.

The signal output from the low pass filter 97 will now be transmitted to two synchronous demodulators 105A and 113A included in their respective error circuits, one yielding a D.C. pitch error signal and the other yielding a D.C. yaw error signal. This is accomplished by having as one input signal to the pitch circuit demodulator portion 105A of the pitch error circuit 105, a square wave $E_5$ of the frequency $f_2$ and having as one input signal to the yaw circuit demodulator portion 113A of the yaw error circuit 113 another square wave $E_6$ of a frequency $f_2$, said two square waves $E_5$ and $E_6$ being in electrical phase quadrature.

Thus, when the filter output signal entering the pitch error circuit demodulator 105A is in phase with the square wave $E_5$ of frequency $f_2$ entering the pitch demodulator 105A, the output signal will be a fully rectified sine wave, as shown by FIGURE 4C, which is acted upon by the remainder of the pitch error circuit 105 to yield a D.C. signal which represents pitch error and a signal of frequency less than $f_3$ which is used to track the source of radiation 61. If, on the other hand, the signal provided by the filter output signal to the pitch demodulator 105A is in quadrature with the square wave input signal $E_5$ to said demodulator 105A, the output from the demodulator portion 105A will be a ripple voltage as shown in FIGURE 4E, and when this signal is acted upon by the remainder of the pitch error circuit 105, no D.C. signal will result and the pitch error will be zero. By analogy the same result occurs in the yaw error circuitry 113.

In order to eliminate demodulator ripple, low pass filters 105B and 113B are included in the pitch and yaw error circuits, respectively. The low pass filters 105B and 113B transmit signals at frequencies between D.C. and the frequency $f_3$ which corresponds to the image motion bandwidth of the system. Thus, signals due to relative image motion at frequencies higher than $f_3$ are rejected. The frequency $f_3$ is fixed at a frequency lower than $f_2$ so as to eliminate the aforenoted demodulator ripple. The exact value of the frequency $f_3$ is in accordance with the requirements of the control network 109, principally the inertia of said network. The use of said low pass filter provides a signal which enables the control network 109 to respond quickly to relative motion between the radiation sensor and the source of radiation. This improved tracking ability is advantageous, for example, where the radiation position sensor is mounted in a space craft, and the space craft has imperfect stability.

This essentially D.C. signal provided by the pitch and yaw error circuitry 105 and 113 may now be the input signals to a control circuit 109 which will control the orientation of the instant device, its housing or a space vehicle carrying the sensor 27 thus allowing a nulling of the system, i.e., causing a reorientation of the system so that the source of radiation 61 may be located at boresight.

It is desired in this system to have pulses of constant amplitude transmitted from the anode 75 to the video amplifier 79. The reasons for this are three-fold. The first is so that the input signal to said video amplifier 79 is sufficiently strong so that the noise inherent in said amplifier 79 will not interfere with the signal and proper amplification may take place. This problem could arise where a weak source of radiation was being sensed and there was minimal electron flow at the output of the electron multiplier tube 71. A second purpose in having a constant amplitude pulse input to the amplifier 79 is that there may be a rejection of low intensity sources of radiation where they are sufficiently spatially separated, as previously discussed, in conjunction with the fixed threshold level of the pulse conditioning circuit also previously discussed. A final purpose in having a constant amplitude pulse input to the video amplifier 79 is that the amplitude of the output of the filter 97 is proportional to the zenith of the source of radiation when said source is within the proportional region. By providing for a constant amplitude pulse input to the video amplifier 79, it will be seen that there will be the same change in amplitude of the filter output signal as shown in FIGURES 3F, 3I and 3L per degree of zenith independent of the intensity of the source of radiation.

To provide for the aforesaid constant amplitude signal independent of the intensity of the source of radiation, the position of which is being found, a feedback circuit is utilized which includes a variable high voltage supply 73 and an automatic gain control circuit 74 of a type well known in the art to regulate the output of the variable high voltage supply 73.

The video amplifier 79 previously discussed, in addition to providing a signal to the pulse conditioning circuit 83 also provides a signal to the automatic gain control circuitry 74, the output signal of which is an input signal to regulate the variable high voltage supply 73. The variable high voltage supply as thus regulated provides the energization to the electron multiplier tube 71. Thus it is seen that if the output signal from the variable high voltage supply 73 is increased, the output signal from the electron multiplier will be increased and thus the input signal to the video amplifier 79 will increase. The feedback loop will thus cause a constant magnitude signal to appear at the output of the video amplifier 79 independent of the intensity of the source of radiation 61 which is being sensed.

The voltage at the output of the automatic gain control circuit 74 and the input to the variable high voltage supply 73 will also yield information concerning the intensity of the source of radiation since the lower the intensity of the source of radiation, the higher the output of the automatic gain control circuitry 74 to provide a signal which will cause an increase in the output of the variable high voltage supply 73 so as to regulate the output of the video amplifier 79 to a predetermined constant value.

The instant device will also sense both point and extended sources of radiation wherein if the source of radiation 61 is extended, the device will sense the center of luminescence of the aforesaid source of radiation.

Due to the use of a scan pattern in the form of an $n$-leafed rose, the highest information rate will occur when the source of radiation is at boresight and thus in the area most critical for acquiring position information the accuracy of the system will be greatest.

It will also be noted that due to the fact that this system makes use only of A.C. signals any deterioration of system components which result in the introduction of D.C. levels will not cause erroneous output signals since the D.C. levels will be removed during demodulation and thus there will be no shifting of the system null position due to aging or wear of the system components.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a signal processing system of a type including a photocathode for emitting a stream of electrons in response to a photoimage impinging thereon, electromagnetic means to effect a scan pattern, said electromagnetic means including a pair of electromagnetic coils arranged in spatial quadrature for deflecting an electron stream emitted by said photocathode, signal translating means responsive to the deflected electron stream for providing an output signal, and means responsive to said output signal for providing a signal in accordance with the position of the light rays on said photocathode; the improvement comprising first means for applying a first double sideband suppressed carrier electrical signal for energizing one of said pair of electromagnetic coils, and second means for applying a second double sideband suppressed carrier electrical signal for energizing the other of said pair of electromagnetic coils, the modulating waves of said two energizing signals being in electrical phase quadrature, and said first and second means effecting by the energization of said pair of electromagnetic coils the scan pattern in a form of an $n$-leafed rose.

2. The improvement defined by claim 1 in which the first means includes a first multiplier means for effecting the first electrical energizing wave at an output thereof from a sinusoidal electrical signal of amplitude A and frequency $f_2$, said signal expressed as $A \sin \omega_2 t$ applied at a first input to the first multiplier means and a sinusoidal electrical signal of amplitude B and frequency $f_1$, $f_1$ being of a greater frequency than the frequency $f_2$, wherein the sinusoidal electrical signal is expressed as $B \sin \omega_1 t$ applied at a second input to the first multiplier means, and the second means includes a second multiplier means for effecting the second electrical energizing wave at an output thereof from a sinusoidal electrical signal of amplitude A and frequency $f_2$ expressed as $A \cos \omega_2 t$ applied at a first input to the second multiplier means and a sinusoidal electrical signal of amplitude B and frequency $f_1$, $f_1$ being of a greater frequency than the frequency $f_2$, wherein the sinusoidal electrical signal is expressed as $B \sin \omega_1 t$ applied at a second input to the second multiplier means.

3. The improvement defined by claim 1 wherein the first means and the second means include in common a wave shaping network, a source of electrical energy providing a square wave output of the frequency $f_1$, and means for connecting the square wave output from said source to said wave shaping network for providing the first and second inputs to said first and second multiplier means.

4. In a signal processing system of a type including a photocathode for emitting a stream of electrons in response to a photoimage impinging thereon, electromagnetic means to effect a scan pattern for deflecting an electron stream emitted by said photocathode, signal translating means including a photomultiplier tube responsive to the deflected electron stream for providing an output signal, and means responsive to said output signal for providing a signal in accordance with the position of the light rays on said photocathode; the improvement comprising first means for applying a variable voltage across said photomultiplier tube to control the output signal, and second means responsive to the intensity of the output signal to control the voltage applied by the variable voltage means so as to maintain a constant amplitude output signal independent of the intensity of the deflected electron stream.

5. The improvement defined by claim 4 in which the second means includes an automatic gain control system for effecting an electrical signal output to control the voltage applied by the first means in response to the intensity of the output signal so as to maintain the constant amplitude output signal.

6. In a signal processing system of a type including a photocathode for emitting a stream of electrons in response to a photoimage impinging thereon, electromagnetic means to effect a scan pattern for deflecting an electron stream emitted by said photocathode, signal translating means responsive to the deflected electron stream for providing an output signal, and means responsive to said output signal for providing signals in accordance with the position of the light rays on said photocathode; the improvement comprising first means for conditioning the output signal so as to provide output pulses which are a function of the position of the photoimage impinging upon the photocathode, second means for demodulating the last mentioned output pulse signal so as to provide a sinusoidal signal of a phase dependent upon the position of the photoimage in one sense and of an amplitude dependent upon the position of the photoimage in another sense, and third means responsive to the phase and amplitude of said sinusoidal signal.

7. The improvement defined by claim 6 in which the first means includes a pulse stripper, an amplifier and a clipper network; the pulse stripper passes portions of said output signal exceeding a predetermined value to the amplifier which transmits an amplification of said portions to the clipper network which removes sections of the amplified portions exceeding a predetermined value.

8. The improvement defined by claim 6 in which the second means includes a demodulator effecting a pulsating wave at an output thereof having electrical characteristics dependent upon the phase relation between a first input signal from said first means and a second input signal, said second signal being a square wave system reference signal of a predetermined frequency.

9. The improvement defined by claim 8 in which the second means includes a filter at the output of the demodulator for effecting a sinusoidal wave of another predetermined frequency at an output of the filter.

10. The improvement defined by claim 6 in which the third means includes a first error network means for effecting at an output thereof a pitch error signal dependent upon the position of the photoimage in the one and other senses, and a second error network means for effecting at an output thereof a yaw error signal dependent upon the position of the photoimage in said one and other senses.

11. The improvement defined by claim 9 in which the third means includes a first error circuit means for effecting an error signal at an output thereof from a square wave electrical signal of frequency $f_2$ derived from a system reference signal $f_1$, the system reference signal $f_1$ being of a greater frequency than frequency $f_2$, means for applying the square wave signal of the frequency $f_2$ at a first input to the first error circuit means, other means for applying the sinusoidal wave output of the filter of a frequency $f_2$ at a second input to the first error circuit means, and a second error circuit means for effecting an error signal at an output thereof from a square wave electrical signal of frequency $f_2$ derived from a system reference signal $f_1$, means for applying the square wave signal of the frequency $f_2$ at a first input to the second error circuit means, said square wave signal of the frequency $f_2$ at the first input to the second error circuit means being in electrical phase quadrature with the square wave signal of the frequency $f_2$ applied at the first input to the first error circuit means, and the sinusoidal wave output of the filter being of a frequency $f_2$ applied at a second input to the second error circuit means.

12. The improvement defined by claim 11 in which the third means includes a control means for effecting a transducing signal at an output thereof from both the error signal provided by the first error circuit means and the error signal provided by the second error circuit means.

13. The improvement defined by claim 11 in which the first error circuit means includes a first demodulator and a first low pass filter, said first demodulator effecting a signal at an output thereof having electrical characteristics dependent upon the phase relation between the first input signal to the first demodulator, said second input signal being the sinusoidal filter output signal of frequency $f_2$ applied at the second input to the first error circuit, the first low pass filter receiving and modifying the first demodulator output signal so as to pass only signal components below a predetermined frequency $f_3$, the frequency $f_3$ being of a lower frequency than that of the frequency $f_2$ and including a D.C. error signal, and the second error circuit means includes a second demodulator and a second low pass filter, the second demodulator effecting a signal at an output thereof having electrical characteristics dependent upon the phase relation between the first input signal square wave to the second error circuit means of a frequency $f_2$ and a second input signal to the second demodulator, said first input signal square wave of the frequency $f_2$ to the second demodulator of the second error circuit means being in electrical phase quadrature with the first input signal square wave of frequency $f_2$ to the first demodulator of the first error circuit means, said second input signal to said second demodulator being the sinusoidal filter output signal of frequency $f_2$ applied at the second input to the second error circuit, the second low pass filter receiving and modifying the second demodulator output signal so as to pass only signal components below that of the predetermined frequency $f_3$.

14. In a signal processing system of a type including a photocathode for emitting a stream of electrons in response to a photoimage impinging thereon, electromagnetic means to effect a scan pattern, said electromagnetic means including a pair of electromagnetic coils arranged in spatial quadrature for deflecting an electron stream emitted by said photocathode, signal translating means including a photomultiplier tube responsive to the deflected electron stream for providing an output signal, and means responsive to said output signal for providing a signal in accordance with the position of the light rays on said photocathode; the improvement comprising first means for applying a first double sideband suppressed carrier electrical wave for energizing one of said pair of electromagnetic coils, second means for applying a second double sideband suppressed carrier electrical wave for energizing the other of said pair of electromagnetic coils, said two energizing waves having modulating waves in electrical phase quadrature, said first and second means effecting by the energization of said pair of electromagnetic coils the scan pattern in the form of an $n$-leafed rose, third means for applying a variable voltage across said photomultiplier tube to control the output signal, and fourth means responsive to the intensity of the output signal to control the voltage applied by the variable voltage means so as to maintain a constant amplitude output signal independent of the intensity of the deflected electron stream.

15. The improvement defined in claim 14 in which the first means includes a first multiplier means for effecting the first double sideband suppressed carrier electrical energizing wave at an output thereof, said first multiplier means having first and second inputs, means for applying to the first input a sinusoidal electrical signal of an amplitude A and a frequency $f_2$, and said first input signal being expressed as $A \sin \omega_2 t$, means for applying to the second input of the first multiplier means a sinusoidal electrical signal of an amplitude B and a frequency $f_1$, the frequency $f_1$ being of a greater frequency than the frequency $f_2$, and said second input sinusoidal electrical signal being expressed as $B \sin \omega_1 t$; the second means includes a second multiplier means for effecting the second double sideband suppressed carrier electrical energizing wave at an output thereof, said second multiplier means having third and fourth inputs, means for applying to said third input a sinusoidal electrical signal of an amplitude A and a frequency $f_2$, said second input signal being expressed as $A \cos \omega_2 t$, means for applying to the fourth input of the second multiplier means a sinusoidal electrical signal of an amplitude B and a frequency $f_1$, the frequency $f_1$ being of a greater frequency than the frequency $f_2$, and said fourth input sinusoidal electrical signal being expressed as $B \sin \omega_1 t$; the first and second means including in common a wave shaping network, a source of electrical energy providing a square wave output of the frequency $f_1$, means for connecting the square wave output from said source to said wave shaping network for providing the first and second inputs to said first multiplier means, and the third and fourth inputs to said second multiplier means.

16. The improvement defined by claim 14 in which the fourth means includes an automatic gain control system for effecting an electrical signal output to control the voltage applied by the third means in response to the intensity of the output signal so as to maintain the constant amplitude output signal.

17. In a signal processing system of a type including a photocathode for emitting a stream of electrons in response to a photoimage impinging thereon, electromagnetic means to effect a scan pattern, said electromagnetic means including a pair of electromagnetic coils arranged in spatial quadrature for deflecting an electron stream emitted by said photocathode, signal translating means responsive to the deflected electron stream for providing an output signal, and means responsive to said output signal for providing a signal in accordance with the position of the light rays on said photocathode; the improvement comprising first means for applying a first double sideband suppressed carrier electrical wave for energizing one of said pair of electromagnetic coils, and second means for applying a second double sideband suppressed carrier electrical wave for energizing the other of said pair of electromagnetic coils, said two energizing waves having modulating waves in electrical phase quadrature, and said first and second means effecting by the energizing of said pair of electromagnetic coils the scan pattern in a form of an $n$-leafed rose, third means for conditioning the output signal so as to provide output pulses which are a function of the position of the photoimage impinging upon the photocathode, fourth means for demodulating the last mentioned output signal so as to provide sinusoidal signals of a phase dependent upon the positon of the photoimage in one sense and of an amplitude dependent upon the position of the photoimage in another sense, and fifth control means responsive to the phase and amplitude of said sinusoidal signals.

18. The improvement defined in claim 17 in which the first means includes a first multiplier means for effecting the first double sideband suppressed carrier electrical energizing wave at an output thereof, said first multiplier means having first and second inputs, means for applying to the first input a sinusoidal electrical signal of an amplitude A and a frequency $f_2$, and said first input signal being expressed as $A \sin \omega_2 t$, means for applying to the second input of the first multiplier means a sinusoidal electrical signal of an amplitude B and a frequency $f_1$, the frequency $f_1$ being of a greater frequency than the frequency $f_2$, and said second input sinusoidal electrical signal being expressed as $B \sin \omega_1 t$; the second means includes a second multiplier means for effecting the second double sideband suppressed carrier electrical energizing wave at an output thereof, said second multiplier means having third and fourth inputs, means for applying to said third input a sinusoidal electrical signal of an amplitude A and a frequency $f_2$, said second input signal being expressed as $A \cos \omega_2 t$, means for applying to the fourth input of the second multiplier means a sinusoidal electrical signal of an amplitude B and a frequency $f_1$, the frequency $f_1$ being of a greater frequency than the frequency $f_2$, and said fourth input sinusoidal electrical signal being expressed as $B \sin \omega_1 t$; the first and second means including in common a wave shaping network, a source of electrical energy providing a square wave output of the frequency $f_1$, means for connecting the square wave output from said source to said wave shaping network for providing the first and second inputs to said first multiplier means and the third and fourth inputs to said second multiplier means, the third means including a pulse stripper, an amplifier and a clipper network, the pulse stripper passing portions of the output signal of the signal translating means exceeding a predetermined value to the amplifier, the amplifier transmitting an amplification of said portions to the clipper network, and the clipper network suppressing sections of the amplified portions exceeding a predetermined value, and passing the remainder of the amplified portions, the fourth means including a demodulator for effecting an electrical wave at an output thereof having electrical characteristics dependent upon the phase relation between the remainder of said amplified portions and a second input signal, said second signal being a square wave system reference signal of a frequency $f_1$, and a filter at the output of the demodulator for effecting a sinusoidal wave of a frequency $f_2$ at the output of the filter, and the fifth means including a first error network means for effecting at the output thereof a pitch error signal dependent upon the position of the photoimage in the one and the other senses, and the second error network means for effecting at an output thereof a yaw error signal dependent upon the position of the photoimage in said one and the other senses.

19. In a signal procession system of a type including a photocathode for emitting a stream of electrons in response to a photoimage impinging thereon, electromagnetic means to effect a scan pattern for deflecting an electron stream emitted by said photocathode, signal translating means responsive to the deflected electron stream for providing an output signal, and means responsive to said output signal for providing signals in accordance with the position of the photoimage on said photocathode; the improvement comprising first means for conditioning the output signal so as to provide output pulses which are a function of the position of the photoimage impinging upon the photocathode, second means for demodulating the last mentioned output pulses so as to provide a sinusoidal signal of a phase dependent upon the position of the photoimage on the photocathode in one sense and of an implitude dependent upon the position of the photoimage on the photocathode in another sense, and third means responsive to the phase and amplitude of said sinusoidal signal to control the position of the photocathode in relation to the position of the photoimage upon the photocathode.

20. In a signal processing system of the type defined by claim 19 in which the signal translating means includes a photomultiplier tube and the improvement defined by claim 19 includes fourth means for applying a variable voltage across said photomultiplier tube to control the output signal, and fifth means responsive to the intensity of the output signal to control the voltage applied by the variable voltage means so as to maintain a constant amplitude output signal independent of the intensity of the deflected electron stream.

21. In a signal processing system of a type including a photocathode for emitting a stream of electrons in response to a photoimage impinging thereon, electromagnetic means to effect a scan pattern, said electromagnetic means including a pair of electromagnetic coils arranged in spatial quadrature for deflecting an electron stream emitted by said photocathode, signal translating means including a photomultiplier tube responsive to the deflected electron stream for providing an output signal, and means responsive to said output signal for providing a signal in accordance with the position of the light rays on said photocathode; the improvement comprising first means for applying a first double sideband suppressed carrier electrical signal for energizing one of said pair of electromagnetic coils, and second means for applying a second double sideband suppressed carrier electrical signal for energizing the other of said pair of electromagnetic coils, said two energizing signals including modulating waves in electrical phase quadrature, and said first and second means effecting by the energization of said pair of electromagnetic coils the scan pattern in a form of an $n$-leafed rose, third means for applying a variable voltage across said photomultiplier tube to control the output signal, fourth means responsive to the intensity of the output signal to control the voltage applied by the variable voltage means so as to maintain a constant amplitude output signal independent of the intensity of the deflected electron stream, fifth means for conditioning the output signal so as to provide output pulses which are a function of the position of the photoimage impinging upon the photocathode, sixth means for demodulating the last mentioned output pulse signal so as to provide a sinusoidal signal of a phase dependent upon the position of the photoimage on the photocathode in one sense and of an amplitude dependent upon the position of the photoimage on the photocathode in another sense, and seventh means responsive to the phase and amplitude of said sinusoidal signal to control the position of the photocathode in relation to the position of the photoimage impinging thereon.

References Cited

UNITED STATES PATENTS

| | | | |
|---|---|---|---|
| 3,194,949 | 7/1965 | Jasperson | 250—203 X |
| 3,259,751 | 7/1966 | Sachs | 250—203 X |
| 3,286,953 | 11/1966 | Dryden | 250—203 X |
| 3,372,266 | 3/1968 | Chilton et al. | 250—203 X |
| 3,366,830 | 1/1968 | Polye | 315—11 |

ROBERT SEGAL, Primary Examiner.

C. R. CAMPBELL, Assistant Examiner.

U.S. Cl. X.R.

315—11

UNITED STATES PATENT OFFICE

CERTIFICATE OF CORRECTION

Patent No. 3,433,895                           March 18, 1969

Saul L. Malkiel

It is certified that error appears in the above identified patent and that said Letters Patent are hereby corrected as shown below:

Column 20, line 1, "implitude" should read -- amplitude --.

Signed and sealed this 30th day of December 1969.

(SEAL)
Attest:

Edward M. Fletcher, Jr.                    WILLIAM E. SCHUYLER, JR.
Attesting Officer                              Commissioner of Patents

UNITED STATES PATENT OFFICE
CERTIFICATE OF CORRECTION

Patent No. 3,433,895　　　　　　　Dated March 18, 1969

Inventor(s) Saul L. Malkiel

It is certified that error appears in the above-identified patent and that said Letters Patent are hereby corrected as shown below:

In claim 3, column 15, line 70 change "1" to - - 2 - - .

SIGNED AND
SEALED
MAY 26 1970

(SEAL)
Attest:

Edward M. Fletcher, Jr.　　　　　　　WILLIAM E. SCHUYLER, JR.
Attesting Officer　　　　　　　Commissioner of Patents